United States Patent
Friedrich et al.

(10) Patent No.: US 12,092,285 B2
(45) Date of Patent: Sep. 17, 2024

(54) LIGHTING DEVICE FOR A MOTOR VEHICLE

(71) Applicant: Bayerische Motoren Werke Aktiengesellschaft, Munich (DE)

(72) Inventors: Martin Friedrich, Munich (DE); Andreas Knoedler-Bunte, Munich (DE); Stefanus Stahl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 133 days.

(21) Appl. No.: 17/800,406

(22) PCT Filed: Apr. 21, 2021

(86) PCT No.: PCT/EP2021/060376
§ 371 (c)(1),
(2) Date: Aug. 17, 2022

(87) PCT Pub. No.: WO2021/228521
PCT Pub. Date: Nov. 18, 2021

(65) Prior Publication Data
US 2023/0105174 A1    Apr. 6, 2023

(30) Foreign Application Priority Data
May 13, 2020   (DE) .................... 10 2020 112 898.3

(51) Int. Cl.
*F21S 43/14*    (2018.01)
*F21S 43/16*    (2018.01)
(Continued)

(52) U.S. Cl.
CPC ............... *F21S 43/14* (2018.01); *F21S 43/16* (2018.01); *F21S 43/26* (2018.01); *F21V 9/32* (2018.02); *F21Y 2115/10* (2016.08)

(58) Field of Classification Search
CPC .. F21S 43/14; F21S 43/16; F21S 43/26; F21S 43/255; F21S 45/00; F21V 9/32;
(Continued)

(56) References Cited

U.S. PATENT DOCUMENTS 6,118,908 A * 9/2000 Bischel .................. G09F 9/305
   385/39
6,141,465 A * 10/2000 Bischel .................. G09F 9/305
   385/16
(Continued)

FOREIGN PATENT DOCUMENTS

CN        105313767 A     2/2016
CN        103680367 B  *  3/2018 ............. B82Y 20/00
(Continued)

OTHER PUBLICATIONS

International Search Report (PCT/ISA/210) issued in PCT Application No. PCT/EP2021/060376 dated Jun. 25, 2021 with English translation (five (5) pages).
(Continued)

*Primary Examiner* — Abdullah A Riyami
*Assistant Examiner* — Syed M Kaiser
(74) *Attorney, Agent, or Firm* — Crowell & Moring LLP

(57) ABSTRACT

A lighting device includes lens which delimits the inner region of the lighting device and is configured so that light exits outwards from the inner region. The lighting device includes one or more light sources in the inner region to emit a first light radiation in a first wavelength range, the lens being non-transparent to the first light radiation. The inner region also includes one or more elements, each of which contains a photoluminescent phosphor, the element(s) being arranged to be illuminated by the first light radiation. The photoluminescent phosphor is configured to emit a second light radiation in a second wavelength range, based on the
(Continued)

first light radiation illuminating the element(s), the second light radiation at least partly exiting through the lens which is transparent to at least a part of the second light radiation.

18 Claims, 1 Drawing Sheet

(51) Int. Cl.
    *F21S 43/20*     (2018.01)
    *F21V 9/32*     (2018.01)
    *F21Y 115/10*     (2016.01)

(58) Field of Classification Search
    CPC ............ F21Y 2115/10; F21W 2103/10; F21W 2106/00; B60Q 3/14; B60Q 3/217
    See application file for complete search history.

(56) References Cited

U.S. PATENT DOCUMENTS

| | | | | |
|---|---|---|---|---|
| 6,167,169 | A * | 12/2000 | Brinkman | G02F 1/011 385/16 |
| 6,522,794 | B1 * | 2/2003 | Bischel | G09F 9/305 385/12 |
| 2009/0159915 | A1 * | 6/2009 | Branchevsky | H01L 33/505 257/E33.061 |
| 2016/0003440 | A1 * | 1/2016 | Wataya | C09K 11/675 313/503 |
| 2017/0130906 | A1 * | 5/2017 | Jiang | H01L 33/62 |
| 2017/0355321 | A1 * | 12/2017 | Dellock | C09K 11/663 |
| 2019/0178460 | A1 | 6/2019 | Hadrath | |
| 2021/0036199 | A1 * | 2/2021 | Nakabayashi | H01L 33/486 |

FOREIGN PATENT DOCUMENTS

| | | | | |
|---|---|---|---|---|
| DE | 20 2015 001 682 | U1 | 3/2015 | |
| DE | 10 2014 104 230 | A1 | 10/2015 | |
| DE | 102014211833 | A1 * | 12/2015 | ............ F21S 48/211 |
| DE | 202017103381 | U1 * | 8/2017 | ............ B60R 13/00 |
| DE | 10 2016 214 517 | A1 | 2/2018 | |
| DE | 10 2018 206 706 | A1 | 11/2019 | |
| EP | 3355664 | A1 * | 8/2018 | |
| EP | 3344664 | B1 * | 9/2019 | ............ A01N 25/10 |
| WO | WO 2015/193039 | A1 | 12/2015 | |

OTHER PUBLICATIONS

German-language Written Opinion (PCT/ISA/237) issued in PCT Application No. PCT/EP2021/060376 dated Jun. 25, 2021 (six (6) pages).

German-language Search Report issued in German Application No. 10 2020 112 898.3 dated Mar. 26, 2021 with partial English translation (12 pages).

Chinese-language Office Action issued in Chinese Application No. 202180016433.4 dated Jan. 6, 2024 with English translation (14 pages).

* cited by examiner

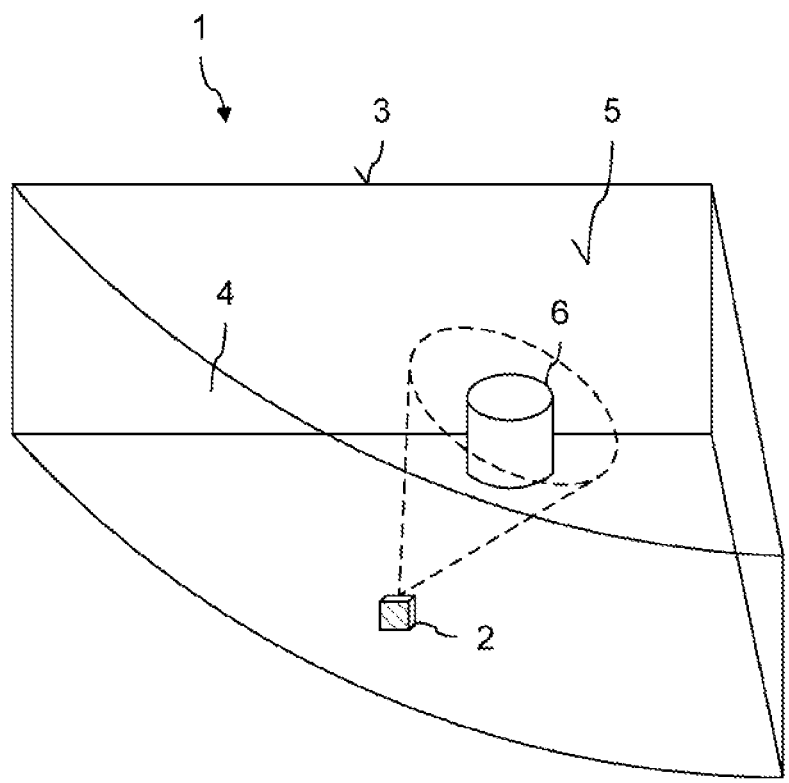

LIGHTING DEVICE FOR A MOTOR VEHICLE

BACKGROUND AND SUMMARY OF THE INVENTION

The invention relates to a lighting device for a motor vehicle.

Various motor vehicle lighting devices are known from the prior art, both in the form of exterior lamps and in the form of interior lamps.

For example, there are exterior lamps in which a light distribution is generated by reflectors onto which the light of one or more light sources is directed. Vehicle lamps which contain a light guide element for defined output of light guided therein, which comes from a light source, are furthermore known.

In conventional motor vehicle lighting devices, the problem often arises that their adaptation, for example in the event of design modifications, entails high new production costs. Often, even in the event of minor modifications of the lighting device, new tools need to be manufactured for its production.

It is an object of the invention to provide a lighting device for a motor vehicle, which generates a light distribution in a different way than conventional lighting devices.

This object is achieved by the claimed invention.

The lighting device according to an embodiment of the invention is intended for a motor vehicle, in particular for an automobile and optionally also for a truck. The lighting device comprises a lens, which delimits an inner region of the lighting device. The lens is intended for exit of light generated during operation of the lighting device from the inner region outward. Here and in what follows, light or light radiation is intended to mean electromagnetic radiation in the visible wavelength spectrum.

One or more light sources are provided in the inner region of the lighting device according to an embodiment of the invention in order to emit first light radiation in a first wavelength range, the lens being opaque for the first light radiation. In other words, the first light radiation is not visible to an observer through the lens. The term: the first wavelength range as well as the second wavelength range mentioned below are to be interpreted broadly in the sense that the wavelength range may optionally even comprise only light with a single wavelength.

Furthermore, one or more bodies, each of which contains a photoluminescent phosphor at least in sections, are provided in the inner region of the lighting device according to an embodiment of the invention, the body or bodies being arranged in such a way that they are illuminated by the first light radiation. Photoluminescent phosphors are known per se. Such phosphors absorb photons, and in this sense light, before subsequently emitting light with a different wavelength than the absorbed light.

The photoluminescent phosphor, used in the lighting device according to an embodiment of the invention, of the body or bodies is configured in such a way that it emits second light radiation in a second wavelength range because of the first light radiation which illuminates the body or bodies. This second light radiation emerges at least partially through the lens, which is achieved by the lens being transmissive for at least a part of the second light radiation.

The lighting device according to an embodiment of the invention has the advantage that a light distribution can be generated in a straightforward way by the illumination of at least one photoluminescent body. In this case, it is ensured that the light radiation originally coming from the one or more light sources is not visible because of the lens used for the light exit, and only the light radiation emitted by the body or bodies is visible. In this way, an appealing light effect can be achieved in the form of one or more self-illuminating bodies.

Depending on the configuration, the lighting device according to an embodiment of the invention may fulfill different purposes in the motor vehicle. In one variant, the lighting device is an interior lamp for a passenger compartment of the motor vehicle. This interior lamp may, for example, be provided in the inner door panel or in the dashboard or at a different position in the passenger compartment. In another variant, the lighting device is an exterior light for the exterior of the motor vehicle, preferably a tail lamp.

In one preferred variant of the lighting device according to the invention, the first light radiation (i.e. its wavelength range) lies within the blue spectral range. Corresponding spectral ranges for different colors are familiar to the person skilled in the art. The blue spectral range covers approximately the wavelength range of between 430 nm and 490 nm. In one preferred variant, the first light radiation comes from a subregion of this blue spectral range, namely from the wavelength range of between 440 nm and 460 nm. Blue light sources are thus used for generating the first light radiation. Such light sources are simple and economical to produce, for example in the form of corresponding LEDs. Nevertheless, the first light radiation may also lie in a different wavelength range for different spectral colors, so long as it is ensured that the lens is opaque for the first light radiation but is at least partially transmissive for the second light radiation resulting therefrom, which is due to the light emission of the photoluminescent phosphor.

In another preferred embodiment, the lens is a red lens. This variant may, for example, be used for the configuration of the lighting device as a tail lamp. Furthermore, this variant is preferably combined with the above-described embodiment in which the first light radiation lies within the blue spectral range. In this case, the fact that a red lens is optically opaque for light in the blue spectral range is used.

In another preferred embodiment, the photoluminescent phosphor of the body or bodies is configured in such a way that the second light radiation emitted by it is white light or lies within the yellow and/or orange spectral range, preferably in the wavelength range of between 590 nm and 610 nm. This variant is preferably combined with the above-described variant which uses a red lens. In this case, the fact that red lenses are partially transmissive for white light and light in the yellow or orange spectral range is used.

Depending on the configuration, the photoluminescent phosphor of the body or bodies may comprise a fluorescent and/or phosphorescent phosphor. A fluorescent phosphor is distinguished in that this phosphor itself emits light essentially only during its illumination, and merely a brief afterglow takes place at the end of the illumination. Conversely, a phosphorescent phosphor is distinguished in that it continues to glow for a certain time even after the end of illumination. Depending on the configuration, different fluorescent or phosphorescent phosphors may be used for the bodies. For example, fluorescent phosphors with the brand name isiphor® (for example the phosphor with the product name SGA 612 100 isiphor®) may be used.

In one particularly preferred embodiment, a respective body of at least some of the body or bodies is formed from a base material (i.e. a matrix), and in particular a plastic, which is transmissive for at least a part of the first light radiation and at least a part of the second light radiation, and in which the photoluminescent phosphor is introduced as a filler. The photoluminescent phosphor is preferably present in the base material of the respective body with a proportion by weight of between 0.5 and 3%. Various materials may be used as a plastic for the base material, in particular acrylic-based plastics such as cured acrylic resin. Here and in what follows, the term: a respective body of at least some of the body or bodies is intended to mean a single body if the illumination device contains only one body, or at least one body if the illumination device contains more than one body.

In another variant, a respective body of at least some of the body or bodies may be formed from a material which is coated with the photoluminescent phosphor. The material of the body may optionally again be a plastic, such as acrylic-based plastic or cured acrylic resin.

In another preferred embodiment, a respective body of at least some of the body or bodies contains the phosphor with a variable density in the volume of the respective body. In this way, appealing light effects may be achieved by brightness variations or brightness gradients in the illuminated body.

In another embodiment which is particularly preferred, a respective body of at least some of the body or bodies is a component manufactured by 3D printing (i.e. by an additive manufacturing method). In this case, a very wide variety of 3D printing methods may be used for manufacturing the body. In one variant, a powder-based 3D printing method is used, for example laser sintering or multijet fusion. Resin-based 3D printing methods may also be used for manufacturing the corresponding bodies, for example stereolithography, DLS printing (DLS=Digital Light Synthesis), DLP printing (DLP=Digital Light Processing) or the PolyJet method. All these methods are known per se and will therefore not be described further in detail. The use of 3D printing for producing the respective bodies has substantial advantages. In particular, 3D printing makes it possible to manufacture bodies having extremely complex structures. These can be made to illuminate very homogeneously by the phosphor introduced.

In another preferred embodiment, a respective body of at least some of the body or bodies is formed in one piece with at least one section of a housing that delimits the inner region of the lighting device. In this way, it is possible for at least a part of the housing to be produced in one manufacturing step together with the bodies.

In another preferred embodiment of the lighting device according to the invention, the body (if only one body is present) or at least one body (in the case of a plurality of bodies) is configured in such a way that the second light radiation which the phosphor of the body or of the at least one body emits generates a luminous symbol with a viewing direction in a plan view of the lens from outside the lighting device. A symbol is in this case intended to mean a representation having a semantic meaning content for the human observer. In particular, a symbol may contain graphical and/or text elements, for example lettering and/or a logo. In this way, appealing design effects may be achieved with the lighting device according to an embodiment of the invention.

Depending on the configuration, the lighting means of the one or moree light sources according to the invention may contain different light sources. In one preferred embodiment, the one or more light sources include one or more LEDs and/or one or more laser diodes. These light sources are very compact, and therefore also allow a compact structure of the lighting device.

In another preferred embodiment, a respective light source of at least some of the light source or sources is not visible to the corresponding observer from outside the lighting device with a viewing direction in a plan view of the lens. In this way, an appealing design of the lighting device is achieved.

As already mentioned above, the lighting device according to an embodiment of the invention may be designed for different intended uses, for example as an interior lamp for the passenger compartment or as an exterior light for the exterior. The second light radiation may in this case at least partially fulfill a primary light function of the lighting device, for example the position light in the case of a tail lamp. Nevertheless, a further light source which fulfills the primary light function in the corresponding lighting device may also be provided. In this case, the second light radiation may supplementarily be used for generating appealing light effects or a symbol, for example an indication of the vehicle brand.

Besides the lighting device described above, the invention relates to a motor vehicle which comprises one or more of the lighting devices according to embodiments of the invention, or one or more preferred variants of the lighting device according to the invention.

An exemplary embodiment of the invention will be described in detail below with the aid of appended FIG. 1.

BRIEF DESCRIPTION OF THE DRAWING

FIG. 1 shows, in a schematic perspective representation, a variant of a lighting device according to the invention.

DETAILED DESCRIPTION OF THE DRAWING

An embodiment of a lighting device according to the invention in the form of a tail lamp 1 will be described below with the aid of FIG. 1. This tail lamp is the left tail lamp of a motor vehicle, which is installed in the left region of its tail. The representation is highly schematized, so that the shapes and dimensions depicted do not correspond to an actual tail lamp.

The tail lamp 1 comprises a housing 3, which is closed by a red lens. The interior of the housing 3 is denoted by reference 5, and corresponds to an inner region in the sense of the patent claims. A multiplicity of technical component parts for fulfilling different light functions may be installed in the tail lamp. For reasons of clarity, however, only components relevant to the invention are shown in the interior of the tail lamp.

As may be seen from FIG. 1, a light source 2 in the form of an LED is arranged next to the lens 4 in the inner region 5. The LED 2 emits blue light in the direction away from the lens toward a body 6, as is depicted by a light cone indicated with dashes. The body 6 is a component manufactured by 3D printing. Any desired 3D printing technology may in this case be used for manufacturing the component. Corresponding examples of technologies have been mentioned above. In the embodiment described here, the component was produced by resin-based 3D printing. The component accordingly consists of a cured resin, which is transparent in the embodiment described here. What is essential for the invention is in this case that a filler in the form of a photoluminescent phosphor has been introduced into the resin during the production of the component.

The blue light of the LED 2 excites the phosphor in the transparent resin of the body 6, so that the phosphor emits light with a color other than blue. In the embodiment described here, a phosphor which emits in the yellow/orange range was used. For example, the phosphor already mentioned above with the product name SGA 612 100 isiphor® may be used for this.

The light emitted by the phosphor impinges on the red lens 4. This lens transmits a part of this light, so that the corresponding body 6 appears luminous. In this case, it should be noted that the red lens is not transmissive for the blue light originally generated by the LED 2. In this way, the appealing light effect of a self-illuminating body is generated since the light radiation of the LED is not externally visible through the lens 4.

In the embodiment of FIG. 1, a cylindrical component was used as the body 6. The component may, however, also be configured in any other desired way, for example as a sphere. In particular, production of the component by 3D printing opens up a large number of possibilities for the production of corresponding bodies in different shapes. In one preferred variant, one or more bodies whose shape generates a symbol by photoluminescence, for example a logo and/or lettering, are used in the lighting device. The symbol is externally visible to an observer when the LED 2 is turned on.

The above-described embodiment of the invention has a number of advantages. In particular, a simply constructed lighting device is provided, in which the lighting effect is achieved by one or more bodies that contain photoluminescent phosphor. In order to excite the photoluminescence, light radiation is in this case used which is not visible from outside the lighting device because the corresponding lens is opaque for this light radiation. The corresponding bodies are preferably manufactured by 3D printing, which makes it possible to produce any desired shapes and to adapt the bodies straightforwardly, for example in the event of a design modification of the lighting device.

LIST OF REFERENCES

1 lighting device
2 light source
3 housing
4 lens
5 inner region
6 body

The invention claimed is:

1. A lighting device for a motor vehicle, the lighting device comprising:
 a lens which delimits an inner region of the lighting device and which is configured for exit of light generated during operation of the lighting device from the inner region outward;
 one or more light sources arranged in the inner region in order to emit first light radiation in a first wavelength range, wherein the lens is opaque for the first light radiation; and
 one or more bodies, each of which contains a photoluminescent phosphor at least in sections, wherein the one or more bodies are arranged in the inner region such that the one or more bodies are illuminated by the first light radiation,
 wherein the photoluminescent phosphor of the one or more bodies is configured such that, because of the first light radiation which illuminates the one or more bodies, the photoluminescent phosphor emits second light radiation in a second wavelength range which emerges at least partially through the lens, which is transmissive for at least a part of the second light radiation, and
 wherein the photoluminescent phosphor is configured such that the second light radiation emitted by the photoluminescent phosphor lies within the yellow and/or orange spectral range.

2. The lighting device according to claim 1, wherein the first light radiation lies within the blue spectral range.

3. The lighting device according to claim 2, wherein the first light radiation lies in a wavelength range of between 440 nm and 460 nm.

4. The lighting device according to claim 1, wherein the lens is a red lens.

5. The lighting device according to claim 1, wherein the photoluminescent phosphor is configured such that the second light radiation emitted by the photoluminescent phosphor lies in a wavelength range of between 590 nm and 610 nm.

6. The lighting device according to claim 1, wherein the photoluminescent phosphor comprises a fluorescent and/or phosphorescent phosphor.

7. The lighting device according to claim 1, wherein a respective body of the one or more bodies is formed from a base material which is transmissive for at least a part of the first light radiation and at least a part of the second light radiation, and in which the photoluminescent phosphor is introduced as a filler.

8. The lighting device according to claim 7, wherein the base material is a plastic.

9. The lighting device according to claim 1, wherein a respective body of the one or more bodies contains the photoluminescent phosphor with a variable density in a volume of the respective body.

10. The lighting device according to claim 1, wherein a respective body of the one or more bodies is a component manufactured by 3D printing.

11. The lighting device according to claim 1, wherein a respective body of the one or more bodies is formed in one piece with at least one section of a housing that delimits the inner region of the lighting device.

12. The lighting device according to claim 1, wherein the one or more bodies are configured such that the second light radiation generates a luminous symbol with a viewing direction in a plan view of the lens from outside the lighting device.

13. The lighting device according to claim 1, wherein the one or more light sources comprise one or more LEDs and/or one or more laser diodes.

14. The lighting device according to claim 1, wherein a respective light source of the one or more light sources is not visible from outside the lighting device with a viewing direction in a plan view of the lens.

15. The lighting device according to claim 1, wherein the lighting device is an interior lamp for a passenger compartment of the motor vehicle.

16. The lighting device according to claim 1, wherein the lighting device is an exterior light for an exterior of the motor vehicle.

17. The lighting device according to claim 16, wherein the lighting device is a tail lamp.

18. The motor vehicle comprising one or more lighting devices according to claim 1.

* * * * *